United States Patent
Sanders et al.

(10) Patent No.: US 11,080,447 B2
(45) Date of Patent: Aug. 3, 2021

(54) SYSTEM AND PART DESIGN BASED ON STRUCTURED REQUIREMENTS

(71) Applicant: The Boeing Company, Chicago, IL (US)

(72) Inventors: Timothy Blake Sanders, Bothell, WA (US); Keith Olson Kubie, Edmonds, WA (US); Matthew David Walson, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 120 days.

(21) Appl. No.: 16/424,233

(22) Filed: May 28, 2019

(65) Prior Publication Data

US 2020/0380079 A1 Dec. 3, 2020

(51) Int. Cl.
*G06F 30/3323* (2020.01)
*G06F 30/392* (2020.01)
*G06F 111/20* (2020.01)
*G06F 119/18* (2020.01)

(52) U.S. Cl.
CPC ........ *G06F 30/3323* (2020.01); *G06F 30/392* (2020.01); *G06F 2111/20* (2020.01); *G06F 2119/18* (2020.01)

(58) Field of Classification Search
CPC .......................... G06F 30/3323; B64C 39/029
See application file for complete search history.

(56) References Cited

U.S. PATENT DOCUMENTS

| 8,732,109 B1 | 5/2014 | Carson et al. |
| 9,026,407 B1 * | 5/2015 | Kennefick ............... G06F 30/20 703/1 |
| 9,870,444 B2 * | 1/2018 | Senesac ........... G05B 19/41805 |
| 2005/0172470 A1 * | 8/2005 | Cobb ....................... B64F 5/10 29/407.1 |

(Continued)

OTHER PUBLICATIONS

Hehenberger, P., et al., "Design, modelling, simulation and integration of cyber physical systems: Methods and applications", Computers in Industry, Oct. 2016, pp. 273-289, vol. 82.

(Continued)

*Primary Examiner* — Suchin Parihar
(74) *Attorney, Agent, or Firm* — Gates & Cooper LLP

(57) ABSTRACT

A computer-implemented method and system provide the ability to design a part to be physically produced. Structured requirements objects for a component are created and each object is a mandatory functional or logical characteristic of the component. Logical system volumes are created in a component system using a computer-aided design (CAD) program. Each of the logical system volumes is an abstract geometric three-dimensional volume in a virtual context of the part to be physically produced. The structured requirements objects are linked to each of the logical system volumes. A part shape is built in the component system using the same virtual context of the part to be physically produced. Volume intersections are determined as the logical system volumes that the part shape intersects with. The structured requirements objects that are linked to the volume intersections are collected. The part is designed based upon the collected structured requirements objects.

24 Claims, 11 Drawing Sheets

(56) References Cited

U.S. PATENT DOCUMENTS

| | | | | |
|---|---|---|---|---|
| 2009/0112540 A1* | 4/2009 | Kessel | ............. | G06T 19/00 |
| | | | | 703/8 |
| 2009/0112820 A1* | 4/2009 | Kessel | ............. | G06F 30/20 |
| 2009/0112973 A1* | 4/2009 | Kessel | ............. | G06F 30/00 |
| | | | | 709/203 |
| 2012/0150517 A1* | 6/2012 | Ray | ............. | G06F 30/00 |
| | | | | 703/10 |
| 2013/0269159 A1* | 10/2013 | Robitaille | ............. | D03D 3/00 |
| | | | | 28/143 |

OTHER PUBLICATIONS

Horvath, L., et al., "Active Driving Content in RFLP Structured Product Model", Recent Advances on Mechanics, Materials, Mechanical Engineering and Chemical Engineering, 2015, pp. 123-131.

Lesinski, N., "3DS Transportation and Mobility—The Increasing Importance of Systems Engineering", 2015, pp. 1-5, https://blogs.3ds.com/3dsmobility/systems-engineering-in-todays-automotive-landscape/, as downloaded Aug. 28, 2015.

Carson, ft, "Implementing Structured Requirements to Improve Requirements Quality", National Defense Industrial Association Systems Engineering Conference, Oct. 2014, pp. 1-11.

\* cited by examiner

SYSTEM AND PART DESIGN BASED ON STRUCTURED REQUIREMENTS

CROSS-REFERENCE TO RELATED APPLICATIONS

This application is related to the following co-pending and commonly-assigned patent application, which application is incorporated by reference herein: U.S. Pat. No. 8,732,109, filed on Jul. 20, 2011 and issued on May 20, 2014, with inventor(s) Ronald Steven Carson, et. al., entitled "STRUCTURED REQUIREMENT GENERATION AND ASSESSMENT".

BACKGROUND OF THE INVENTION

1. Field of the Invention

The present invention relates generally to computer aided design (CAD) applications, and in particular, to a method, apparatus, system, and article of manufacture for designing a part based on system requirements.

2. Description of the Related Art

When engineering parts and systems, system designers are required to meet/comply with system requirements that may be distributed through many sources. These requirements may overlap and interact between systems, resulting in situations where designers are not aware of how their design choices affect child/parent/related systems. Further, the distributed nature of the various requirements (performance, manufacturing, costs, etc.) causes difficulty in correlating optimization methods that may improve designs.

To better understand these problems, an example may be helpful. In aerospace and/or mechanical engineering, hundreds if not thousands of requirements may apply to different parts with respect to their design, location, etc. Compliance with such requirements is mandatory in order to properly design an airplane, a part/system within an airplane, or other mechanical part (e.g., an engine). In the preliminary/high-level design stages, designers attempt to define an overall system configuration and provide an early project configuration. For example, a designer may design simple parts and run various studies to determine how to build the parts and systems using the parts. Such designs often include system level block diagrams. The preliminary design system may be decomposed into one or more systems. Likewise high-level requirements may be decomposed into one or more sub-requirements that are specified in a text based document that are provided to a detail designer. In the detailed design/engineering phase, a design solution has been matured, and each aspect of a project/product may be elaborated upon using solid modeling, drawings, simulations, as well as specifications. In other words, the engineer takes the text based requirements documents and plans, and builds a detailed part in a solid/CAD modeling application. Similarly an engineer may perform analysis and simulation to verify the design meets the identified requirements. Such a task consumes considerable time and communication while synchronizing the two-dimensional (2D) text documents with the three-dimensional (3D) solid/CAD modeling and the associated analysis and simulation.

In view of the above, the problem of the prior art is that of designing and analyzing a part from the preliminary to the detailed design in an efficient manner while seamlessly integrating requirements of such parts.

SUMMARY OF THE INVENTION

As described above, ensuring a part meets all program criteria is a constant struggle within programs that may contain thousands of requirements. To make situations worse, criteria is usually exposed through a number of different methods and may be interpreted by the designer uniquely from the requirement drafter, creating scenarios of poor configuration for product definition. Embodiments of the invention provide a structured objects system that utilizes three-dimensional (3D) space (e.g., within the 3DX™ application) to envelope volumes where a criteria may apply. The advantage of a structured objects system is that the system may be flexible to accommodate local or global requirements. As an example: a stringer system (consisting of a volume with criteria only associated to the stringer locally), and a corrosion system (a volume with drainage criteria associated to the full fuselage) may overlap. By using a functional, logical and requirements applications in a 3D space, criteria is associated to volumes. By performing a volumetric intersection analysis between the collection of system volumes (e.g., stringer, corrosion, body joins, frames, etc.) and the detail parts (e.g., a stringer), the designer may identify requirements applicable to the resulting volumetric intersection (e.g., stringer, corrosion, and body joins). Other volumes, such as frames or payloads, would not be found in the intersection, and would not need to be identified.

Accordingly, structured objects systems provide a much more robust method of assigning requirements to a large system/product (e.g., an airplane) as they allow such a large system/product to be developed structurally from a systematic, intermediary level (e.g., body joins, acreage detail definition, wet areas, explosive zones, etc.) rather than at the physical product level, inviting unique criteria at each detail. The collection of structured objects systems (also known as a criteria model) is effectively a matrix of requirements located in the same three-dimensional space/virtual context as the 3D part to be physically produced (e.g., the aircraft model) and may create disruptions in the industry through machine learning interpretation and knowledge based model manipulation.

In addition, embodiments of the invention may utilize native copy and paste features/capabilities within a structured objects system to allow for a systems architecture approach to structured design that will provide the ability to complete product development much more quickly and efficiently than in the past by invoking Model Based Engineering (MBE) practices.

In view of the above, embodiments of the invention provide a method, apparatus, and system for designing a part to be physically produced. One or more structured requirements objects are created for a component. Each of the structured requirements objects consist of a mandatory functional or logical characteristic of the component. One or more logical system volumes are created in a component system using a computer-aided design (CAD) program. Each of the logical system volumes is an abstract geometric three-dimensional volume in a virtual context of the part to be physically produced. The structured requirements objects are linked to each of the logical system volumes. A part shape is built in the component system (within the CAD program) using the same virtual context of the part to be physically produced. One or more volume intersections are determined. The volume intersections identify the logical system volumes that the part shape intersects with. The structured requirements objects that are linked to the volume intersections are identified and collected. The part is designed, in the CAD program, based upon the collected structured requirements objects.

Further to the above, one or more specification objects may be created for a component. The specification objects consist of instructions regarding how to comply with each of the structured requirements objects. In addition, the specification objects are linked to each of the logical system volumes. Specification objects may have a many-to-many relationship with the logical system volumes. (i.e., each specification object may have a relationship with (may be mapped to) many logical system volumes, and each logical system volume may have a relationship with (may be mapped to) many specification objects)

The design may further be verified by simulation and analysis (aka virtual test). Such simulation and analysis mimics the expected environments and operations of the product and predicts the response to those conditions. The predicted responses are evaluated against the established criteria and final product performance is verified.

The mandatory characteristics may include a functional characteristic that consist of a functional or performance behavior of the program performing a required action or function in response to a trigger or system state condition. Alternatively (or in addition), the mandatory characteristic may include a design characteristic that constrains a design or fabrication of the part, an environmental characteristic that specifies factors that surround and affect the part, and/or a suitability characteristic that describes a capability, safety, security, reliability, availability, maintainability, or other health characteristics of the part.

Each of the logical system volumes may consist of a skeleton. Some examples of skeletons are primary structure wireframe grids, movable mechanism representations, relational layout models (RLMs/Boeing), interface control models (ICMs/Boeing), and master datum files (MDFs/Boeing).

As used herein, the term "skeleton" describes an abstract geometric representation of the resulting physical product. This abstraction is insufficient to produce the physical product but is sufficient to describe the unique physical features/components of the physical product. Benefit-cost-analysis (BCA) examples of the application of skeletons are Master Dimension Surfaces, Relational Layout Models, and Interface Control Models. The determining which of the logical system volumes that the part shape intersects may include performing an intersection analysis between the logical system volumes and the part shape. The designing of the part may further include displaying the collected structured requirements objects in the CAD program.

In addition to the above, a machine learning tool may be used to refine and optimize the product design process. For the machine learning tool, a new product preliminary design is received in a product context. Additional structured requirements objects for the new product preliminary design are retrieved. To retrieve the additional structured requirements objects, additional logical system volumes within the product context are retrieved, additional logical system volumes that intersect with the new product preliminary design are collected, and additional structured requirements objects that are linked to the collected additional logical system volumes are retrieved. Secondary structured requirements objects and functional performance are then retrieved from an established product. This retrieval consist of retrieving secondary logical system volumes associated with secondary product contexts (for the established product) based on a comparison to the new product preliminary design, retrieving the secondary structured requirements objects that are linked to the secondary logical system volumes, retrieving one or more secondary parts that intersect with the secondary logical system volumes, and retrieving the functional performance for the secondary parts. It may be noted that in addition to geometric relationships between parts/volumes, machine learning utilized in one or more embodiments of the invention may analyze/allow for relationships by feature/function between parts/volumes.

The machine learning tool then comparing the new product preliminary design to the established product by comparing the additional structured requirements objects to the secondary structured requirements objects, evaluating the common requirements with respect to the functional performance, and outputting an ideal new product based on the comparing. The new product is then evaluated and the additional structured requirements objects used for the new product preliminary design are improved.

Further to the above, embodiments of the invention may also include physically manufacturing the designed part.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a CAD based system for capturing system requirements in a series of volumes. Each volume contains a given system and may contain a plurality of other volumes (e.g., one volume may contain an aircraft environmental control system [ECS] and another volume may contain a blower used in the ECS system). An inheritance scheme is placed within volumes such that the intersection of a part with a volume leads the volume to contain the requirements of the part. This inheritance method assures that the interplay between systems and their requirements are easily captured and displayed to a engineer. Volumes containing part geometry and varying requirements can be reused for rapid design in subsequent systems or may be transferred to a learning system configured to optimize designs based on requirements and geometry.

Detail Design Problem

Figure 1:
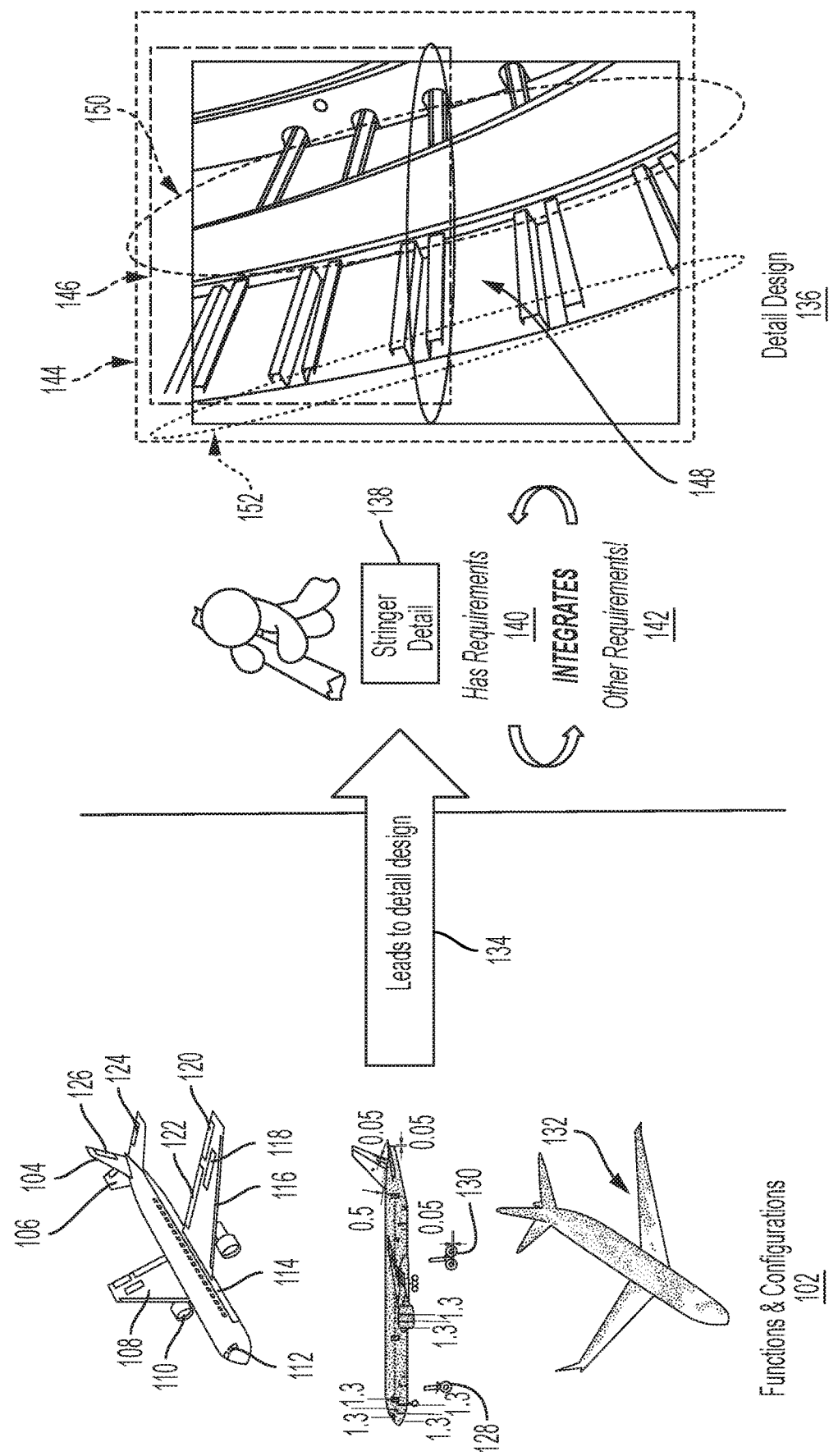
FIG. 1 illustrates problems encountered by a detail designer for an aircraft.

FIG. 1 illustrates problems encountered by an engineer/designer (e.g., a user that performs simulation/analysis/validation/verification activities) for a large scale program such as an aircraft. The preliminary designer defines functions and configurations 102. For example, the preliminary designer may define the functions and configurations 102 for the vertical stabilizer 104 (to control yaw), the horizontal stabilizer 106 (to control pitch), the wing 108 (to generate lift), the jet engine 110 (to generate thrust), the cockpit 112 (for command and control), the fuselage body 114 (to hold things together, carry payload and fuel), slats 116 to change lift, spoiler 118 (to change lift and drag [rotate body]), the aileron 120 (to change roll [rotate body]), flaps 122 (to change lift and drag), elevator 124 (to change pitch [up-down]), and the rudder 126 (to change yaw [side-to-side]). Further, the preliminary designer may define the functions and configurations 102 for nose gear detail 128 and main gear detail 130 (e.g., the main gear is 0.05 from the bottom of the truck). In addition, the preliminary designer may define other functions and configurations for the overall design of the airplane 132.

The functions and configurations 102 lead 134 to the detail design 136 of the individual components/parts/systems 104-132. For example, the functions and configurations 102 may lead to the detail design 136 of the stringer 138 of the aircraft (e.g., the thin strip of material to which the skin of an aircraft is fastened) which has various requirements 140 and integrates additional requirements 142. The detail design 136 for the stringer 138 may include details for the suppliers 144 and regions 146 of the stringer 138. The detail design 136 may also include details in the areas surrounding the suppliers 144 and regions 146 such as surrounding detail (skins) 148, surrounding details (frames) 150, and integration areas 152. As illustrated by FIG. 1, a detail designer has a dilemma trying to determine which requirements to apply to a particular part/structure and how to maintain and organize such requirements.

Figure 2:
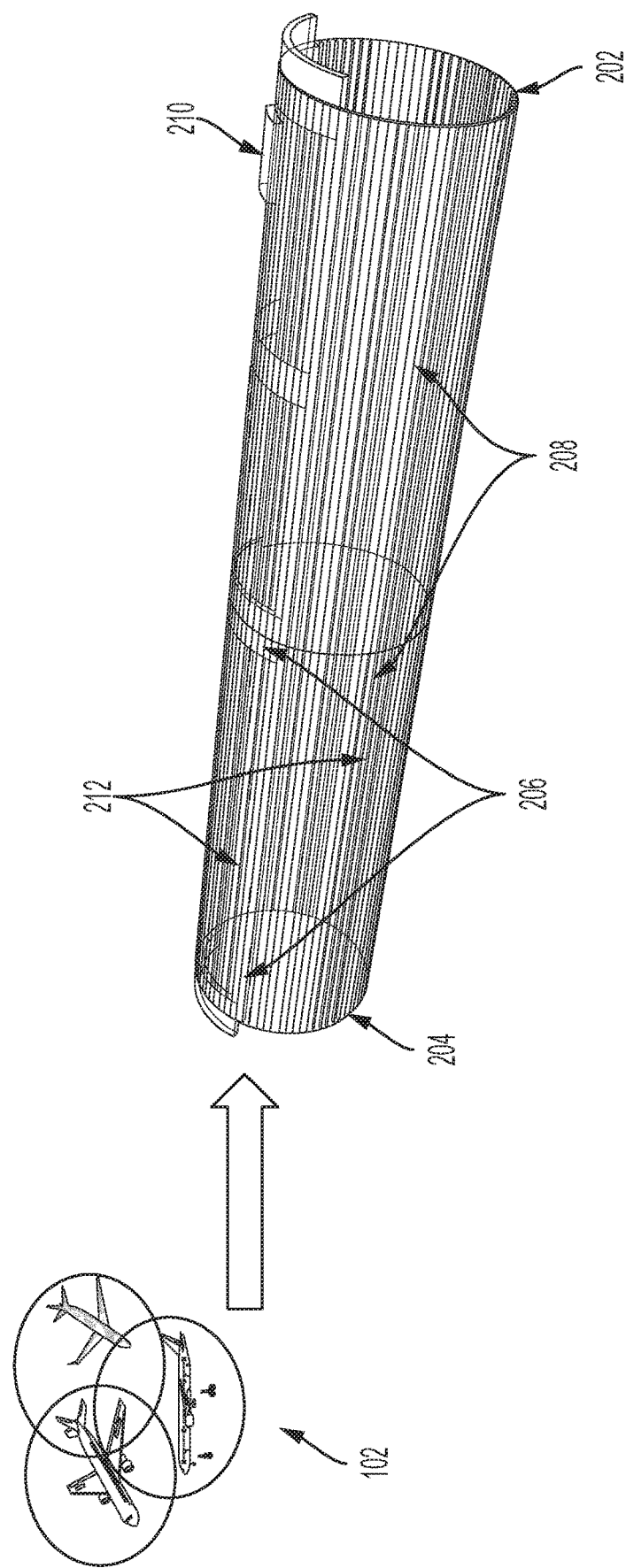
FIG. 2 illustrates requirements visualized within the context of master geometry in accordance with one or more embodiments of the invention.

FIG. 2 illustrates requirements visualized within the context of master geometry in accordance with one or more embodiments of the invention. In particular, the concept depicted in FIG. 2 is that of visualizing the different requirements that originate from the preliminary design/functions and configurations 102 in the context of a 3D volumetric structure 202. The different requirements include EME (electromagnetic effects) requirements 204, joint requirements 206, manufacturing requirements 208, equipment requirements 210, and corrosion requirements 212. As illustrated, the different requirements 204-212 apply to different areas/parts of the 3D volumetric structure 202 (also referred to as the master geometry).

Figure 3:
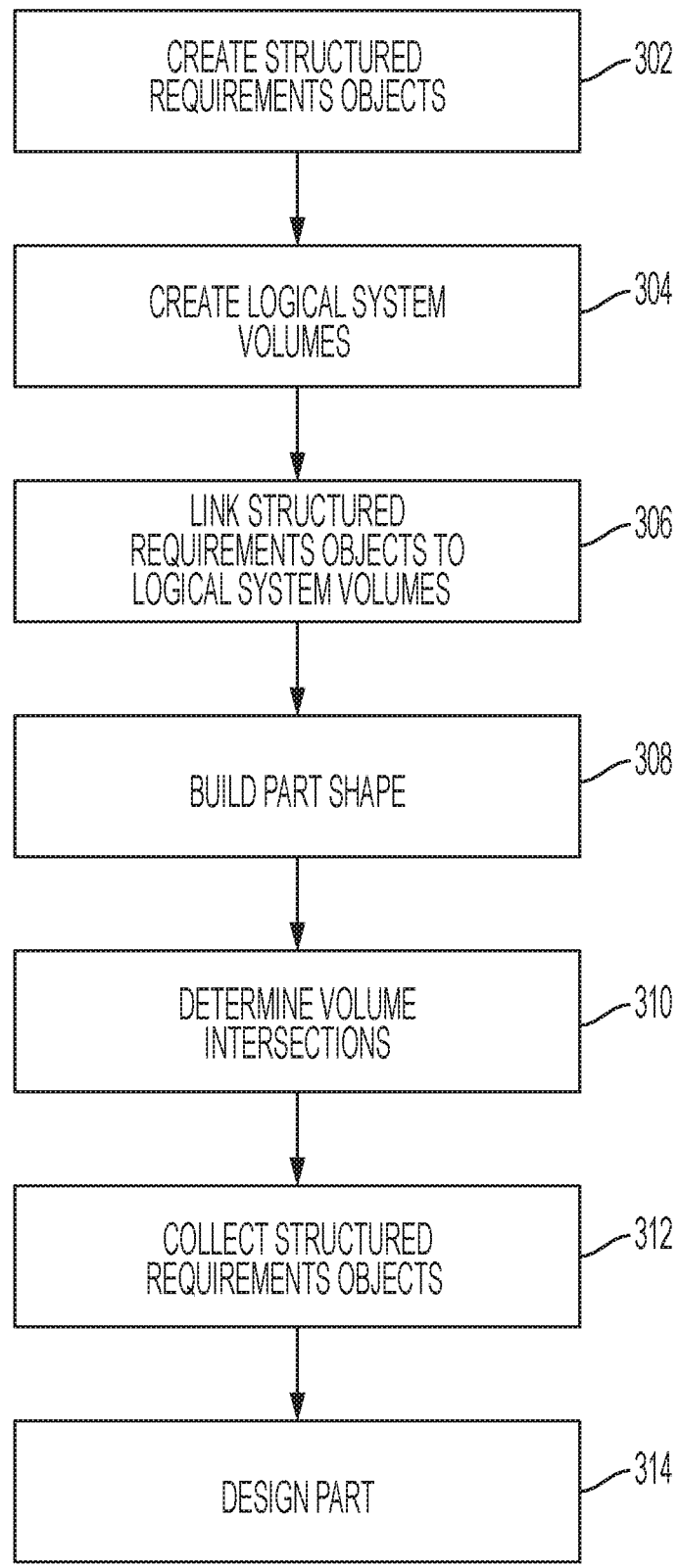
FIG. 3 illustrates the logical flow for designing a part in accordance with or more embodiments of the invention.

To further organize and maintain the requirements 204-212, embodiments of the invention provide a requirements model/structure/object as part of the part design process. FIG. 3 illustrates the logical flow for designing a part in accordance with or more embodiments of the invention. As used herein the part may include sub-parts and may consist of a system such as a whole airplane.

At step 302, one or more structured requirements objects are created for a component. Each of the structured requirements objects consist of a mandatory characteristic (e.g., functional or logical) of the component. Such a mandatory characteristic may have various attributes. For example, a mandatory characteristic may consist of a functional characteristic including a functional or performance behavior of the product performing a required action or function in response to a trigger or system state condition. Alternatively (or in addition), the mandatory characteristic may include a design characteristic that constrains a design or fabrication of the product. In yet another embodiment, the mandatory characteristic is an environmental characteristic that specifies factors that surround and affect the product. Further, the mandatory characteristic may be a suitability characteristic that describes a safety, security, reliability, availability, maintainability, or other health characteristics of the product.

Figure 4:
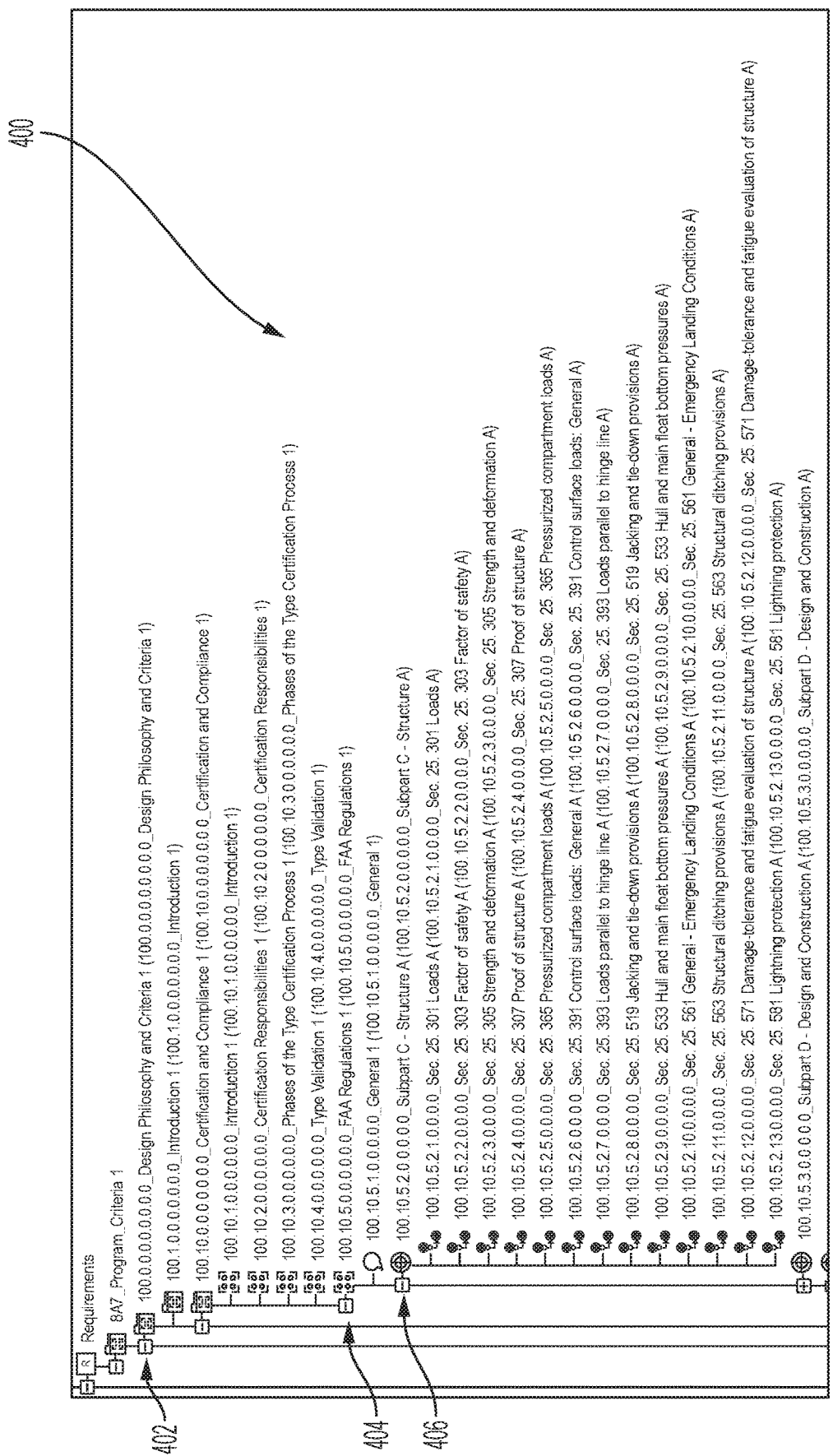
FIG. 4 illustrates a native client view of a hierarchically organized structured requirements objects in accordance with one or more embodiments of the invention.

In view of the above, step 302 provides for the creation/organization/standardization of structured requirements objects for a particular program. Such structured requirements objects may be specific to a particular product and company that is manufacturing/designing the product. FIG. 4 illustrates a native client view of a hierarchically organized structured requirements objects in accordance with one or more embodiments of the invention. As illustrated, lines from a requirements document (e.g., a spreadsheet) may be mapped to the structured requirements objects 400. For example, a list of reference documents may be mapped to the design philosophy and criteria 1 folder 402. Further, FAA regulations may be organized into/map to the FAA regulations folder 404. In addition, structure requirements may be mapped to the structure A folder 406. In this regard, each line of a requirements document/spreadsheet may be understood/mapped to requirements, specifications, folders, and chapter objects within a hierarchy of structured requirements objects 400 (e.g., a 3DX source available from DASSAULT SYSTEMS). Such a mapping/system enabling a digital thread for storing, reading, modifying, organizing etc. of the structured requirements objects.

In one or more embodiments, such structured requirements objects 400 are organized into an RFLP (requirements functional logical physical) tree (e.g., a hierarchically organized tree). For example, the RFLP tree may include a system (i.e., high level system) that contains logical collections of requirements, components, logical volumes, and physical components. As described above, the structured requirements objects may include functional and logical requirements for components. Components may include structured system components (e.g., a logical system) and may include one or more parts/subparts of a system. The physical components may provide a logical volume of an abstract structured system. Details regarding such logical and physical systems are described below.

Step 302 may also include the creation of one or more specification objects for a component. The specification objects include instructions regarding how to comply with each of the structured requirements objects. Further the specification objects are also linked to each of the logical system volumes (described below).

Once the requirements have been established at step 302, step 304 provides for creating one or more logical system volumes in a component system using a CAD program. Each of the logical system volumes is an abstract geometric 3D volume in a virtual context of the part to be physically produced. In this regard, one may view each logical system volume as representing a part that will be physically built and installed (e.g., a 1-to-1 relationship). However, the logical system volumes are abstract 3D geometric representations and specifically relate and/or are defined in a virtual context of the part to be physically produced. In this regard, the abstract nature of the logical system volume may provide that the volume consists of a skeleton such as a wireframe or skeleton. Specifically, a skeleton model is an optional wireframe and/or surface model built within the virtual context of the part. The skeleton model depicts part interface and orientation, and part characteristics identified as parametric data. The skeleton model is constructed prior to the part and drives functional and logical information into the part. The skeleton model provides additional capability by creating a virtual relationship between a part and a unique part analysis where full part definition is not necessary to complete that analysis.

In an aircraft design example, a logical system volume may provide for a logical system volume under the whole airplane floor that corresponds to a fuselage shape (e.g., to identify a corrosion zone on the bottom of an aircraft for drainage purposes). In such an example, the logical system volume is defined in the virtual context of the airplane fuselage.

Figure 5:
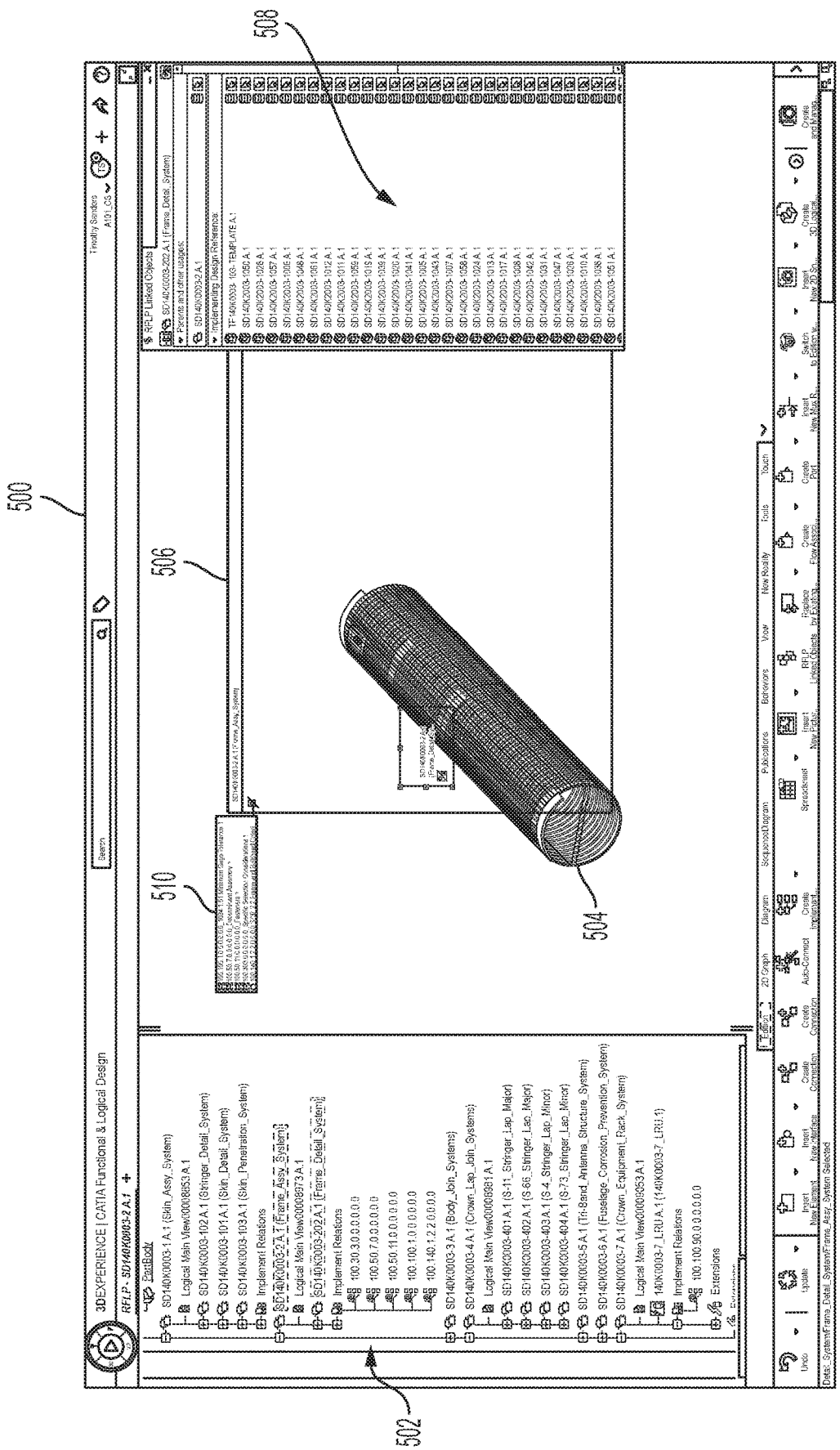
FIG. 5 illustrates a completed requirements model where structured requirements objects have been linked to logical system volumes in accordance with one or more embodiments of the invention.

At step 306, the one or more structured requirements objects are linked to each of the logical system volumes. In this regard, the structured requirements objects are each assigned to one or more logical system volumes in the same context as the final product (i.e., within the CAD model). Further, step 306 may also include linking specification objects to each of the logical system volumes. FIG. 5 illustrates a completed requirements model where structured requirements objects have been linked to logical system volumes in accordance with one or more embodiments of the invention. Specifically, FIG. 5 illustrates the various components needed to understand a fuselage in a single view/user interface 500. A textual hierarchical based list of the components of the fuselage are illustrated in component tree 502. A view of a logical system volume 504 is illustrated within system view 506. The user interface 500 also includes a textual list 508 of the logical system volumes (also referred to as system implemented volumes and skeletons) and upon selecting a particular logical system volume (either from the text list 508 or in system view 506), the applicable structed requirements objects 510 may be displayed.

In view of the above, the structured requirements objects are created/acquired at step 302, logical system volumes are created within a CAD program (e.g., logical system volumes are created on an existing or new CAD model of a particular component/product) at step 304, and the structured requirements objects are then linked/associated with the logical system volumes at step 306.

At step 308, a part shape is built in the component system using the same virtual context as the part to be physically produced within the CAD program (i.e., which is the same as the logical system volume). In this regard, at step 308, the detail design process begins. The issue becomes identifying where this new part belongs with respect to which requirements apply to the new part. For example, a new part may belong along the bottom of an airplane in an corrosion zone but may also belong in an integration zone where the corrosion zone and integration zone have different applicable requirements.

Figure 6:
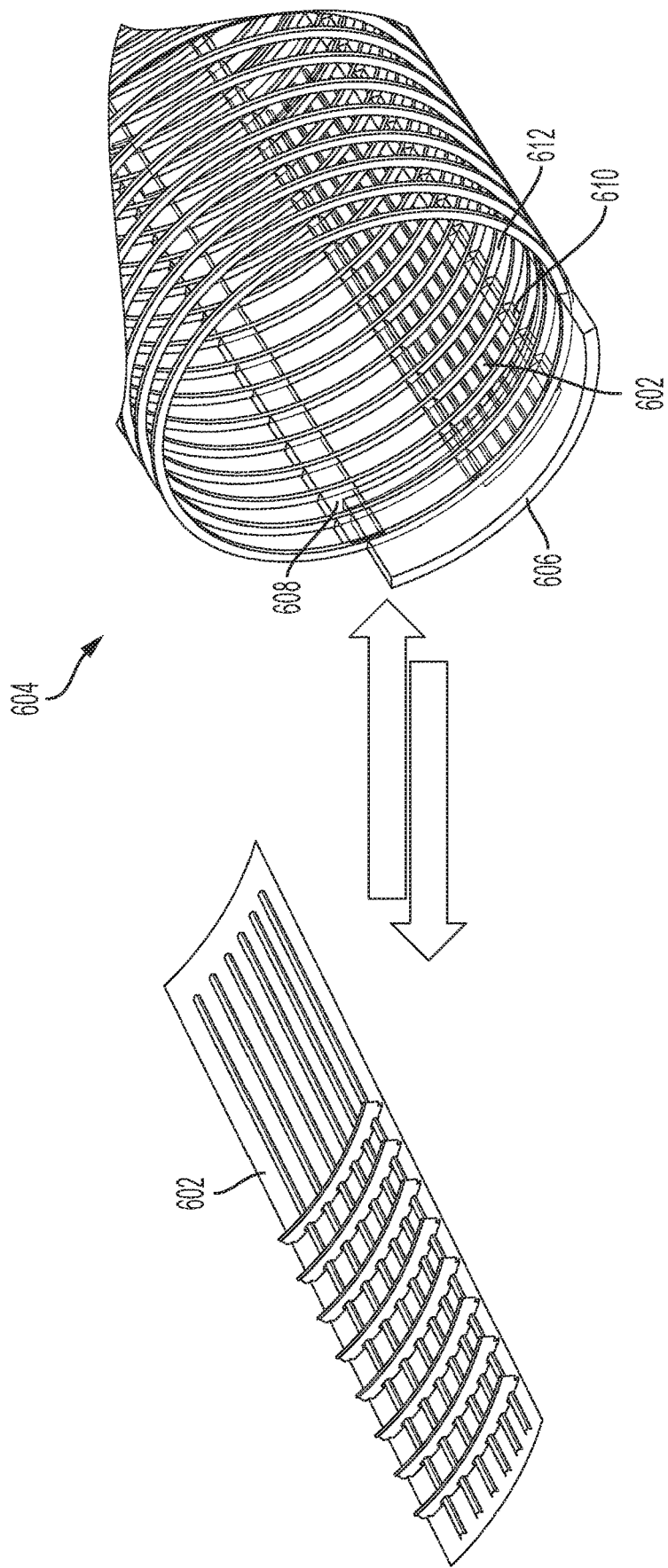
FIG. 6 illustrates the placement of a new part/part shape within a CAD model and an indication of those logical system volumes that the new part/part shape intersects with in accordance with one or more embodiments of the invention.

At step 310, one or more volume intersections are determined. The volume intersections consist of the one or more logical system volumes that the part shape intersects with. In other words, at step 310, an interference/intersection/clash analysis is conducted/performed to determine which logical system volumes intersect with the new part. In this regard, the result of the intersection analysis is referred herein to as the volume intersections. FIG. 6 illustrates the placement of a new part/part shape 602 within a CAD model 604 and an indication of those logical system volumes 606-612 that the new part/part shape 602 intersects with in accordance with one or more embodiments of the invention.

At step 312, the structured requirements objects (and specification objects, if created) that are linked to the volume intersections 606-612 are collected. In view of the above, the logical system volumes 606-612 that the part shape intersects with are determined at step 310 and the structured requirements objects associated with those logical system volumes 606-612 are collected at step 312. Together, steps 310-312 may be referred to as requirement interrogation. One may also note that embodiments of the present invention perform the requirement interrogation within the context of a 3D volumetric/geometric space.

At step 314, based on the collected structured requirements objects, the part is designed in the CAD program. Thus, once steps 310-312 determine which requirements apply to the new part being designed, the detailed design for that part can be conducted. In addition, such steps may also include a reverse interference analysis wherein an analysis determines what features are being designed and a part with a preliminary designer's requirements may be suggested/utilized based on the features and the requirements for such features. Step 314 may further include the physical manufacturing of the designed part.

It may be noted that in addition to the steps of FIG. 3, functional definitions, requirements development, product architecture development, integrated product architecture and design development, as well as the subsequent allocation of requirements to product architecture elements may be recursively applied as a system of interest level is changed (e.g., moving "down the architecture").

Machine Learning Tool

Figure 7:
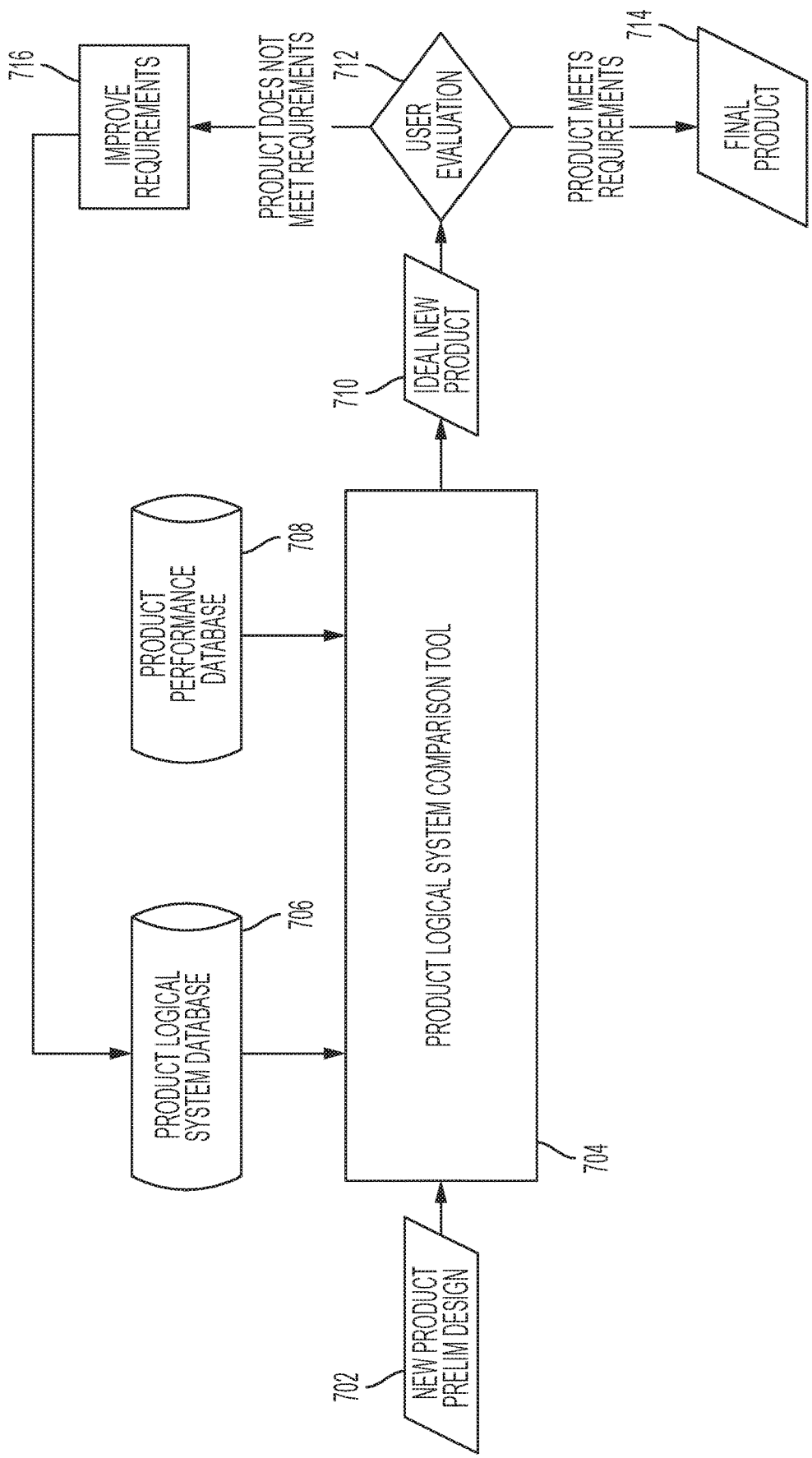
FIG. 7 illustrates a system level view and use of a machine learning tool to design a final product in accordance with one or more embodiments of the invention.

When designing a part/component, machine learning may be utilized to create/assist with the detail design of a part/component. FIG. 7 illustrates a system level view and use of a machine learning tool to design a final product in accordance with one or more embodiments of the invention.

The preliminary design (e.g., low details) 702 for a new product is created/received (e.g., within the virtual context of the part to be physically produced) and/or input by a user into a product logical system comparison tool 704. Two databases are also maintained—a product logical system database 706 and a product performance database 708. The product logical system database 706 contains logical system volumes for the new product preliminary design 702 and other (established) products. The product logical system database 706 also contains structured requirements objects (also referred to as product specifications) for the new product preliminary design 702 and other (established) products. The product performance database 708 includes performance characteristics for parts (e.g., based on attributes/properties of the parts).

Figure 8:
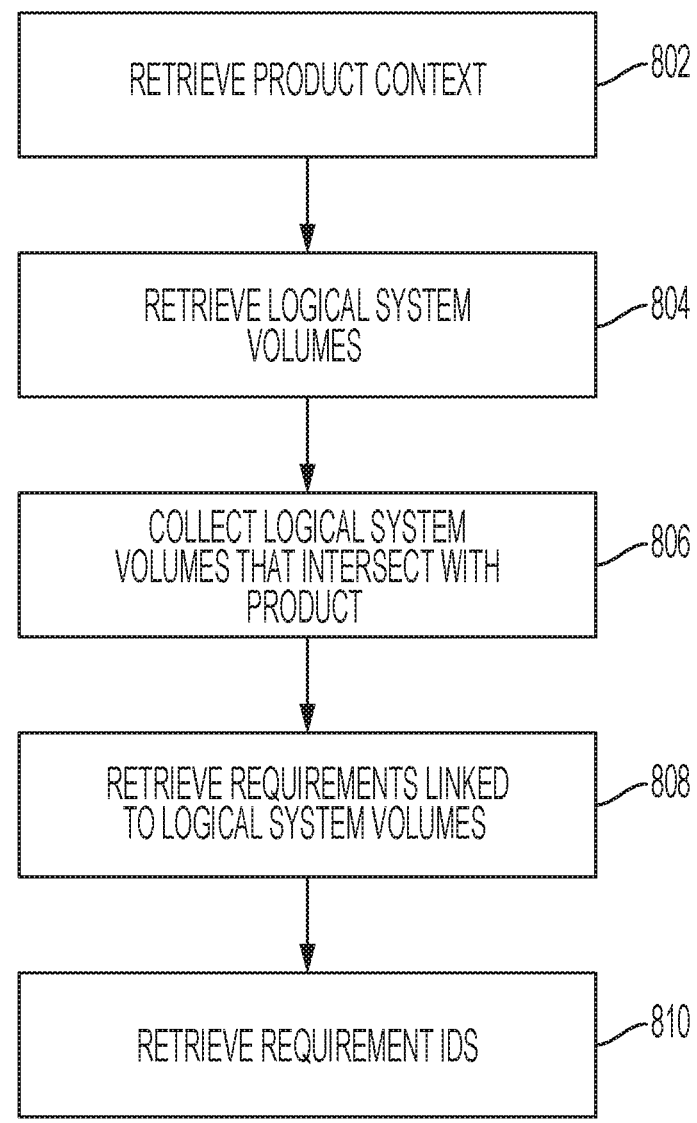
FIG. 8 illustrates the steps for retrieving the additional structured requirements objects for the new product preliminary design in accordance with one or more embodiments of the invention.

The product logical system comparison tool 704 processes and compares the data from the two databases 706 and 708 in view of the new product preliminary design 702 to output an ideal new product 710. In particular, the comparison tool 704 first retrieves additional structured requirements objects (also referred to as product specifications) for the new product preliminary design 702 from the product logical system database 706. FIG. 8 illustrates the steps for retrieving the additional structured requirements objects for the new product preliminary design in accordance with one or more embodiments of the invention. At step 802, the product context from the new product preliminary design 702 is retrieved. At step 804, additional logical system volumes within the product context are retrieved. At step 806, the additional logical system volumes that intersect with the preliminary design of the product are determined/identified and collected. At step 808, the additional structured requirements objects linked to the collected additional logical system volumes are retrieved. At step 810, unique identifiers (IDs) for the retrieved additional structured requirements objects are retrieved.

Figure 9:
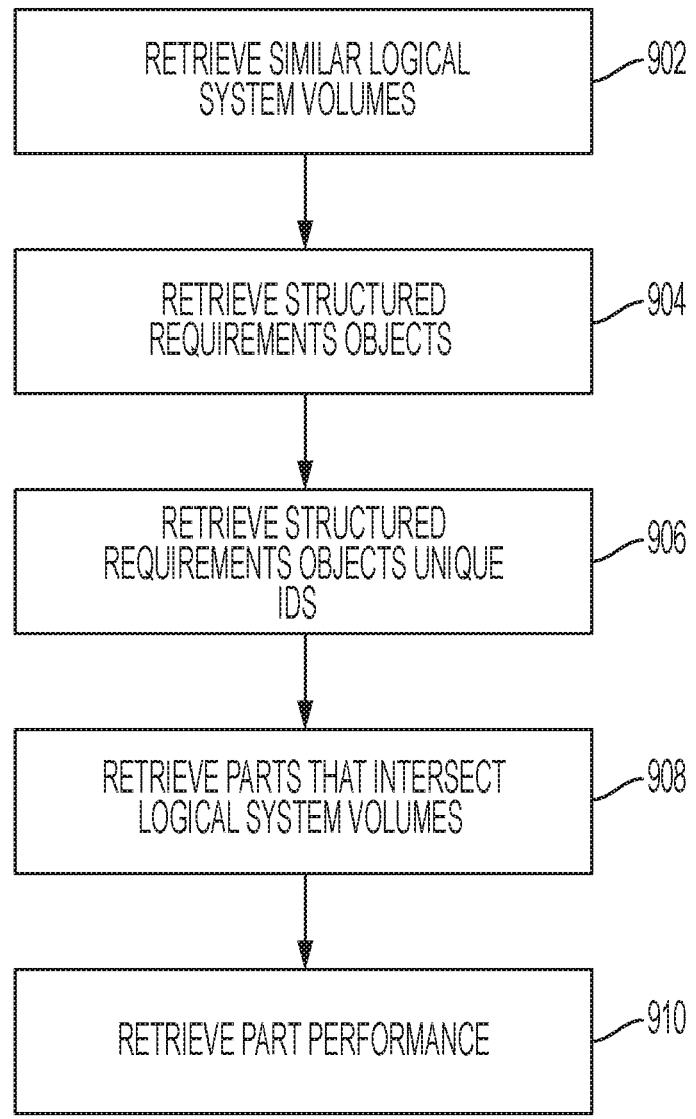
FIG. 9 illustrates the logical flow for retrieving similar secondary structured requirements objects and functional performance characteristics from an established product in accordance with one or more embodiments of the invention.

The comparison tool 704 further retrieves similar secondary structured requirements objects (and functional performance characteristics) for another (established) products with similar secondary logical system volumes (i.e., also from database 706). FIG. 9 illustrates the logical flow for retrieving similar secondary structured requirements objects and functional performance characteristics from an established product in accordance with one or more embodiments of the invention. At step 902, secondary logical system volumes associated with other/secondary product contexts (for the established product) are retrieved (e.g., based on a comparison to the new product preliminary design). Such a step includes determining similar secondary product contexts and retrieving secondary logical system volumes from such secondary contexts. At step 904, secondary structured requirements objects linked to the (other product's) secondary logical system volumes are retrieved. At step 906, the unique IDs, for the retrieved secondary structured requirements objects, are retrieved. At step 908, secondary parts that intersect with the secondary logical system volumes are identified and retrieved. At step 910, functional part performance from the retrieved secondary products are retrieved.

Based on the steps identified in FIGS. 8 and 9, the product logical system comparison tool 704 then compares the new product preliminary design 702 with previous products (e.g., using performance characteristics from the product performance database 708). Specifically, the tool 704 compares the additional structured requirements objects for the new product (i.e., as determined via the steps of FIG. 8) with the secondary structured requirements objects from other secondary logical system volumes. The comparison includes an evaluation for common structured requirements objects versus the product functional performance (e.g., as determined via the steps of FIG. 9). Based on the comparison, the tool 704 outputs the ideal new product 710. The ideal new product 710 includes ideal structured requirements objects for the new product, where the ideal structured requirements objects are similar to other (established products). Further, the ideal new product 710 is based on pervious similar product functions.

At step 712, the user evaluates the ideal new product 710. If the ideal new product 710 meets the requirements/specifications, the ideal new product 710 is produced/output as the final product 714. However, if the ideal new product 710 does not meet the requirements/specifications, the user improves the additional structured requirements objects (used for the new product preliminary design 702) at step 716 and stores them in the product logical system database 706. In this manner, the structured requirements objects for new products are refined and improved over time based on a comparison between the new products with other established products.

Hardware Environment

Figure 10:
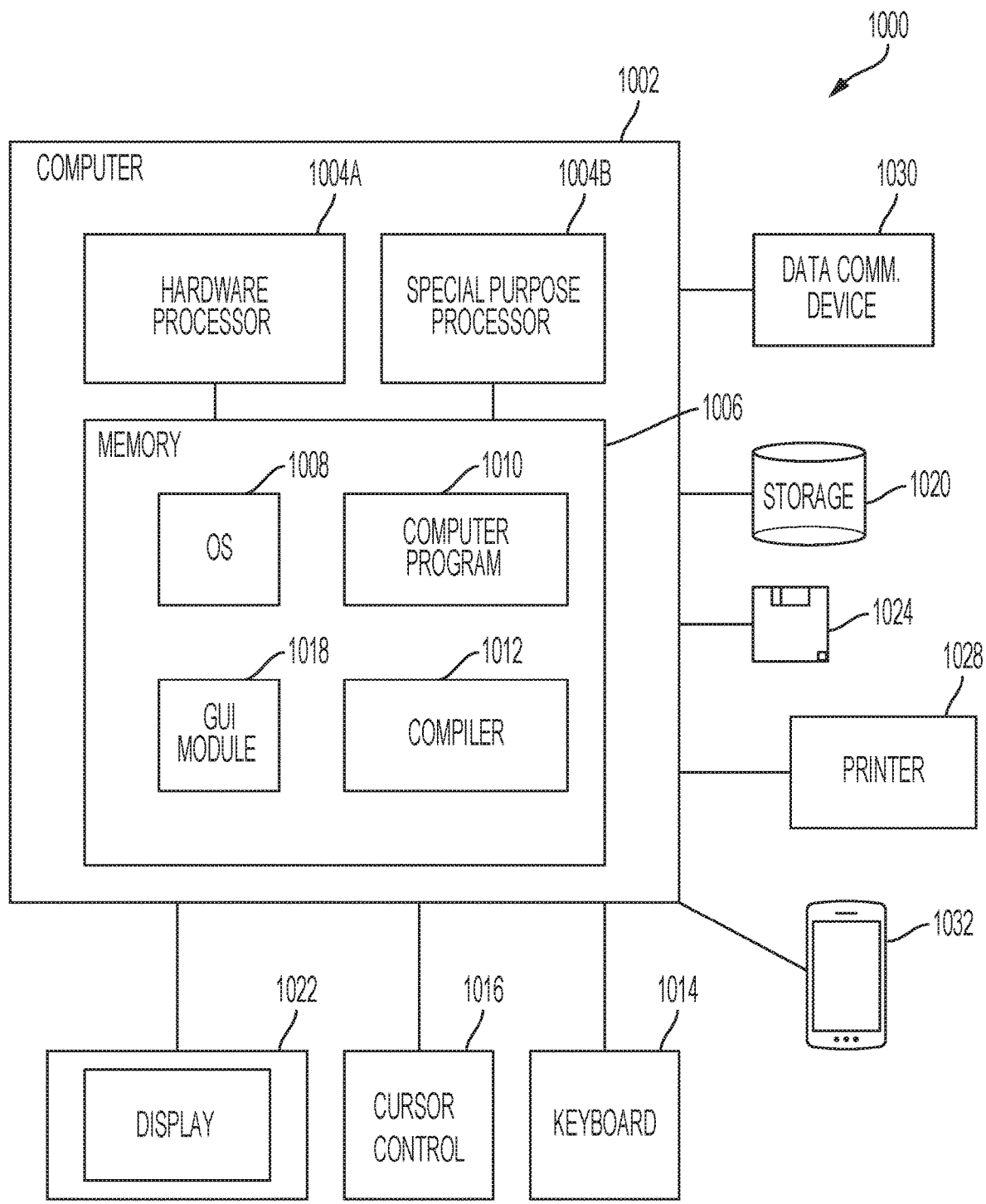
FIG. 10 is an exemplary hardware and software environment used to implement one or more embodiments of the invention.

FIG. 10 is an exemplary hardware and software environment 1000 (referred to as a computer-implemented system and/or computer-implemented method) used to implement one or more embodiments of the invention. The hardware and software environment includes a computer 1002 and may include peripherals. Computer 1002 may be a user/client computer, server computer, or may be a database computer. The computer 1002 comprises a hardware processor 1004A and/or a special purpose (hardware) processor 1004B (hereinafter alternatively collectively referred to as processor 1004) and a memory 1006, such as random access memory (RAM). The computer 1002 may be coupled to, and/or integrated with, other devices, including input/output (I/O) devices such as a keyboard 1014, a cursor control device 1016 (e.g., a mouse, a pointing device, pen and tablet, touch screen, multi-touch device, etc.) and a printer 1028. In one or more embodiments, computer 1002 may be coupled to, or may comprise, a portable or media viewing/listening device 1032 (e.g., an MP3 player, IPOD, NOOK, portable digital video player, cellular device, personal digital assistant, etc.). In yet another embodiment, the computer 1002 may comprise a multi-touch device, mobile phone, gaming system, internet enabled television, television set top box, or other internet enabled device executing on various platforms and operating systems.

In one embodiment, the computer 1002 operates by the hardware processor 1004A performing instructions defined by the computer program 1010 (e.g., a computer-aided design [CAD] application) under control of an operating system 1008. The computer program 1010 and/or the operating system 1008 may be stored in the memory 1006 and may interface with the user and/or other devices to accept input and commands and, based on such input and commands and the instructions defined by the computer program 1010 and operating system 1008, to provide output and results.

Output/results may be presented on the display 1022 or provided to another device for presentation or further processing or action. In one embodiment, the display 1022 comprises a liquid crystal display (LCD) having a plurality of separately addressable liquid crystals. Alternatively, the display 1022 may comprise a light emitting diode (LED) display having clusters of red, green and blue diodes driven together to form full-color pixels. Each liquid crystal or pixel of the display 1022 changes to an opaque or translucent state to form a part of the image on the display in response to the data or information generated by the processor 1004 from the application of the instructions of the computer program 1010 and/or operating system 1008 to the input and commands. The image may be provided through a graphical user interface (GUI) module 1018. Although the GUI module 1018 is depicted as a separate module, the instructions performing the GUI functions can be resident or distributed in the operating system 1008, the computer program 1010, or implemented with special purpose memory and processors.

In one or more embodiments, the display 1022 is integrated with/into the computer 1002 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1002 according to the computer program 1010 instructions may be implemented in a special purpose processor 1004B. In this embodiment, some or all of the computer program 1010 instructions may be implemented via firmware instructions stored in a read only memory (ROM), a programmable read only memory (PROM) or flash memory within the special purpose processor 1004B or in memory 1006. The special purpose processor 1004B may also be hardwired through circuit design to perform some or all of the operations to implement the present invention. Further, the special purpose processor 1004B may be a hybrid processor, which includes dedicated circuitry for performing a subset of functions, and other circuits for performing more general functions such as responding to computer program 1010 instructions. In one embodiment, the special purpose processor 1004B is an application specific integrated circuit (ASIC).

The computer 1002 may also implement a compiler 1012 that allows an application or computer program 1010 written in a programming language such as C, C++, Assembly, SQL, PYTHON, PROLOG, MATLAB, RUBY, RAILS, HASKELL, or other language to be translated into processor 1004 readable code. Alternatively, the compiler 1012 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc.

After completion, the application or computer program 1010 accesses and manipulates data accepted from I/O devices and stored in the memory 1006 of the computer 1002 using the relationships and logic that were generated using the compiler 1012.

The computer 1002 also optionally comprises an external communication device such as a modem, satellite link, Ethernet card, or other device for accepting input from, and providing output to, other computers 1002.

In one embodiment, instructions implementing the operating system 1008, the computer program 1010, and the compiler 1012 are tangibly embodied in a non-transitory computer-readable medium, e.g., data storage device 1020, which could include one or more fixed or removable data storage devices, such as a zip drive, floppy disc drive 1024, hard drive, CD-ROM drive, tape drive, etc. Further, the operating system 1008 and the computer program 1010 are comprised of computer program 1010 instructions which, when accessed, read and executed by the computer 1002, cause the computer 1002 to perform the steps necessary to implement and/or use the present invention or to load the program of instructions into a memory 1006, thus creating a special purpose data structure causing the computer 1002 to operate as a specially programmed computer executing the method steps described herein. Computer program 1010 and/or operating instructions may also be tangibly embodied in memory 1006 and/or data communications devices 1030, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1002.

Figure 11:
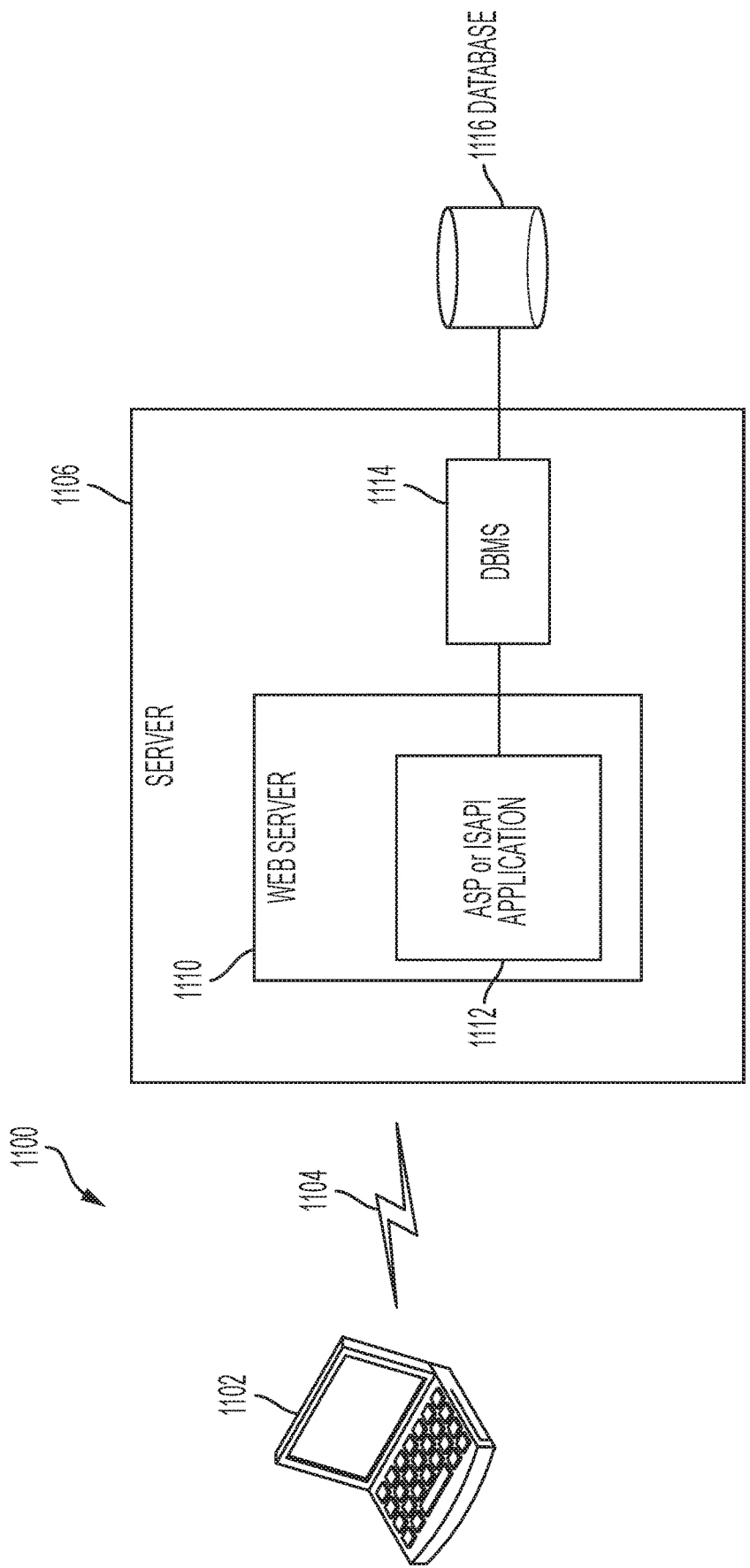
FIG. 11 schematically illustrates a typical distributed/cloud-based computer system using a network to connect

FIG. 11 schematically illustrates a typical distributed/cloud-based computer system 1100 using a network 1104 to connect client computers 1102 to server computers 1106. A typical combination of resources may include a network 1104 comprising the Internet, LANs (local area networks), WANs (wide area networks), SNA (systems network architecture) networks, or the like, clients 1102 that are personal computers or workstations (as set forth in FIG. 10), and servers 1106 that are personal computers, workstations, minicomputers, or mainframes (as set forth in FIG. 10). However, it may be noted that different networks such as a cellular network (e.g., GSM [global system for mobile communications] or otherwise), a satellite based network, or any other type of network may be used to connect clients 1102 and servers 1106 in accordance with embodiments of the invention.

A network 1104 such as the Internet connects clients 1102 to server computers 1106. Network 1104 may utilize ethernet, coaxial cable, wireless communications, radio frequency (RF), etc. to connect and provide the communication between clients 1102 and servers 1106. Further, in a cloud-based computing system, resources (e.g., storage, processors, applications, memory, infrastructure, etc.) in clients 1102 and server computers 1106 may be shared by clients 1102, server computers 1106, and users across one or more networks. Resources may be shared by multiple users and can be dynamically reallocated per demand. In this regard, cloud computing may be referred to as a model for enabling access to a shared pool of configurable computing resources.

Clients 1102 may execute a client application or web browser and communicate with server computers 1106 executing web servers 1110. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1102 may be downloaded from server computer 1106 to client computers 1102 and installed as a plug-in or ACTIVEX control of a web browser. Accordingly, clients 1102 may utilize ACTIVEX components/component object model (COM) or distributed COM (DCOM) components to provide a user interface on a display of client 1102. The web server 1110 is typically a program such as MICROSOFT'S INTERNET INFORMATION SERVER.

Web server 1110 may host an Active Server Page (ASP) or Internet Server Application Programming Interface (ISAPI) application 1112, which may be executing scripts. The scripts invoke objects that execute business logic (referred to as business objects). The business objects then manipulate data in database 1116 through a database management system (DBMS) 1114. Alternatively, database 1116 may be part of, or connected directly to, client 1102 instead of communicating/obtaining the information from database 1116 across network 1104. When a developer encapsulates the business functionality into objects, the system may be referred to as a component object model (COM) system. Accordingly, the scripts executing on web server 1110 (and/or application 1112) invoke COM objects that implement the business logic. Further, server 1106 may utilize MICROSOFT'S TRANSACTION SERVER (MTS) to access required data stored in database 1116 via an interface such as ADO (Active Data Objects), OLE DB (Object Linking and Embedding DataBase), or ODBC (Open DataBase Connectivity).

Generally, these components 1100-1116 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1102 and 1106 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1102 and 1106. Embodiments of the invention are implemented as a software/CAD application on a client 1102 or server computer 1106. Further, as described above, the client 1102 or server computer 1106 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for designing a part to be physically produced, comprising:
    creating (302) one or more structured requirements objects for a component, wherein each of the one or more structured requirements objects comprises a mandatory characteristic of the component;
    creating (304) one or more logical system volumes (504)s in a component system using a computer-aided design (CAD) program, wherein each of the one or more logical system volumes (504) comprises an abstract geometric three-dimensional volume in a virtual context of the part to be physically produced;
    linking (306) one or more structured requirements objects to each of the one or more logical system volumes (504);
        building (308) a part shape in the component system using the same virtual context of the part to be physically produced within the CAD program;
    determining (310) one or more volume intersections (606-612), wherein the one or more volume intersections (606-612) comprise the one or more logical system volumes (504) that the part shape intersects with;
    collecting (312) the one or more structured requirements objects that are linked to the one or more volume intersections (606-612); and
    designing (314) the part, in the CAD program, based upon the collected one or more structured requirements objects.

2. The computer-implemented method of claim 1, further comprising:
    creating one or more specification objects for the component, wherein the specification objects comprise instructions regarding how to comply with each of the one or more structured requirements objects; and
    linking one or more specification objects to each of the one or more logical system volumes (504).

3. The computer-implemented method of claim 1, further comprising:
    verifying the design by simulation and analysis.

4. The computer-implemented method of claim 1, wherein the mandatory characteristic comprises:
    a functional characteristic comprising a functional or performance behavior of the part performing a required action or function in response to a trigger or system state condition.

5. The computer-implemented method of claim 1, wherein the mandatory characteristic comprises:
    a design characteristic that constrains a design or fabrication of the part.

6. The computer-implemented method of claim 1, wherein the mandatory characteristic comprises:
    an environmental characteristic that specifies factors that surround and affect the part.

7. The computer-implemented method of claim 1, wherein the mandatory characteristic comprises:
    a suitability characteristic that describes a safety, security, reliability, availability, maintainability, or other health characteristics of the part.

8. The computer-implemented method of claim 1, wherein each of the one or more logical system volumes (504) comprises a skeleton.

9. The computer-implemented method of claim 1, wherein the determining which of the one or more logical system volumes (504) that the part shape intersects with comprises:
    performing an intersection analysis between the one or more logical system volumes (504) and the part shape.

10. The computer-implemented method of claim 1, wherein the designing the part further comprises displaying the collected one or more structured requirements objects in the CAD program.

11. The computer-implemented method of claim 1, further comprising:
    (a) receiving a new product preliminary design (702) in a product context;

(b) retrieving additional structured requirements objects, of the one or more structured requirements objects, for the new product preliminary design (702) by:
   (1) retrieving one or more additional logical system volumes (504) within the product context;
   (2) collecting one or more of the additional logical system volumes (504) that intersect with the new product preliminary design (702);
   (3) retrieving the additional structured requirements objects that are linked to the collected additional logical system volumes (504);
(c) retrieving secondary structured requirements objects and functional performance from an established product by:
   (1) retrieving secondary logical system volumes (504) associated with a secondary product context, for the established product, based on a comparison to the new product preliminary design (702);
   (2) retrieving the secondary structured requirements objects that are linked to the secondary logical system volumes (504);
   (3) retrieving one or more secondary parts that intersect with the secondary logical system volumes (504);
   (4) retrieving the functional performance for the one or more secondary parts;
(d) comparing the new product preliminary design (702) to the established product by:
   (1) comparing the additional structured requirements objects to the secondary structured requirements objects; and
   (2) evaluating the common requirements with respect to the functional performance; and
   (3) outputting an ideal new product (710) based on the comparing;
(e) evaluating the new product and improving the additional structured requirements objects used for the new product preliminary design (702).

12. The computer-implemented method of claim 1, further comprising:
manufacturing the designed part.

13. A computer-implemented system for designing a part to be physically produced, comprising:
(a) a computer (1002) having a memory (1006);
(b) a processor (1004) executing on the computer (1002);
(c) the memory (1006) storing a computer-aided design (CAD) application (1112) that is executed by the processor (1004), wherein the CAD application (1112):
   (1) creates (302) one or more structured requirements objects for a component, wherein each of the one or more structured requirements objects comprises a mandatory characteristic of the component;
   (2) creates (304) one or more logical system volumes (504) in a component system, wherein each of the one or more logical system volumes (504) comprises an abstract geometric three-dimensional volume in a virtual context of the part to be physically produced;
   (3) links (306) one or more structured requirements objects to each of the one or more logical system volumes (504);
   (4) builds (308) a part shape in the component system using the same virtual context of the part to be physically produced;
   (5) determines (310) one or more volume intersections (606-612), wherein the one or more volume intersections (606-612) comprise the one or more logical system volumes (504) that the part shape intersects with;
   (6) collects (312) the one or more structured requirements objects that are linked to the one or more volume intersections (606-612); and
   (7) designs (314) the part, based upon the collected one or more structured requirements objects.

14. The computer-implemented system of claim 13, wherein the CAD application (1112) further:
creates one or more specification objects for the component, wherein the specification objects comprise instructions regarding how to comply with each of the one or more structured requirements objects; and
links (306) one or more specification objects to each of the one or more logical system volumes (504).

15. The computer-implemented system of claim 13, wherein the CAD application (1112) further:
verifies the design by simulation and analysis.

16. The computer-implemented system of claim 13, wherein the mandatory characteristic comprises:
a functional characteristic comprising a functional or performance behavior of the part performing a required action or function in response to a trigger or system state condition.

17. The computer-implemented system of claim 13, wherein the mandatory characteristic comprises:
a design characteristic that constrains a design or fabrication of the part within the CAD application (1112).

18. The computer-implemented system of claim 13, wherein the mandatory characteristic comprises:
an environmental characteristic that specifies factors that surround and affect the part within the CAD application (1112).

19. The computer-implemented system of claim 13, wherein the mandatory characteristic comprises:
a suitability characteristic that describes a safety, security, reliability, availability, maintainability, or other health characteristics of the part within the CAD application (1112).

20. The computer-implemented system of claim 13, wherein each of the one or more logical system volumes (504) comprises a skeleton.

21. The computer-implemented system of claim 13, wherein the CAD application (1112) determines which of the one or more logical system volumes (504) that the part shape intersects with by:
performing an intersection analysis between the one or more logical system volumes (504) and the part shape.

22. The computer-implemented system of claim 13, wherein the CAD application (1112) designs (314) the part by displaying the collected one or more structured requirements objects.

23. The computer-implemented system of claim 13, wherein the CAD application (1112) further:
(a) receives a new product preliminary design (702) in a product context;
(b) retrieves additional structured requirements objects, of the one or more structured requirements objects, for the new product preliminary design (702) by:
   (1) retrieving one or more additional logical system volumes (504) within the product context;
   (2) collecting one or more of the additional logical system volumes (504) that intersect with the new product preliminary design (702);
   (3) retrieving the additional structured requirements objects that are linked to the collected additional logical system volumes (504);

(c) retrieves secondary structured requirements objects and functional performance from an established product by:
(1) retrieving secondary logical system volumes (504) associated with a secondary product context, for the established product, based on a comparison to the new product preliminary design (702);
(2) retrieving the secondary structured requirements objects that are linked to the secondary logical system volumes (504);
(3) retrieving one or more secondary parts that intersect with the secondary logical system volumes (504);
(4) retrieving the functional performance for the one or more secondary parts;
(d) compares the new product preliminary design (702) to the established product by:
(1) comparing the additional structured requirements objects to the secondary structured requirements objects; and
(2) evaluating the common requirements with respect to the functional performance; and
(3) outputting an ideal new product (710) based on the comparing;
(e) evaluates the new product and improving the additional structured requirements objects used for the new product preliminary design (702).

24. The computer-implemented system of claim 13, further comprising: a physical manufacture of the designed part.

* * * * *